United States Patent
Brogan

Patent Number: 5,251,436
Date of Patent: Oct. 12, 1993

[54] THRUST-REDUCING, CHAOTIC-FLOW NOZZLE

[75] Inventor: Robert Brogan, Rancho Cordova, Calif.

[73] Assignee: Aerojet General Corporation, Rancho Cordova, Calif.

[21] Appl. No.: 907,466

[22] Filed: Jul. 1, 1992

[51] Int. Cl.⁵ .............................................. F02K 9/00
[52] U.S. Cl. .......................................... 60/254; 60/271
[58] Field of Search ........................... 60/253, 254, 271

[56] References Cited

U.S. PATENT DOCUMENTS

| | | |
|---|---|---|
| 3,208,384 | 9/1965 | Fountain . |
| 3,341,129 | 9/1967 | Adams et al. . |
| 3,344,603 | 10/1967 | Iwanciow ............................ 60/271 |
| 3,453,958 | 7/1969 | Lai . |
| 3,691,770 | 9/1972 | Nunn ................................... 60/271 |
| 3,938,444 | 2/1976 | Foote et al. . |
| 4,011,720 | 3/1977 | Kirschner, Jr. ...................... 60/254 |
| 4,452,039 | 6/1984 | Hodgkins et al. . |
| 4,631,916 | 12/1986 | Le Tanter et al. ................... 60/253 |
| 4,688,379 | 8/1987 | Buechele-Buecher et al. ...... 60/253 |
| 4,739,708 | 4/1988 | Halpin et al. . |

FOREIGN PATENT DOCUMENTS

| | | | |
|---|---|---|---|
| 729133 | 12/1942 | Fed. Rep. of Germany ........ 60/271 |
| 989809 | 9/1951 | France ................................. 60/271 |

*Primary Examiner*—Richard A. Bertsch
*Assistant Examiner*—Timothy S. Thorpe
*Attorney, Agent, or Firm*—Townsend and Townsend Khourie and Crew

[57] ABSTRACT

A nozzle assembly for a rocket type decoy used to protect aircraft from missile attack. The nozzle assembly includes an annular chamber and a mixing chamber which is spaced radially inward from the annular chamber. The chambers are separated by a wall and interconnected by multiple jet ports formed in the wall. The nozzle assembly is positioned adjacent to a conventional rocket combustion chamber such that when energetic compositions are reacted in the chamber, the combustion products flow into the annular chamber, radially inward through the multiple jet ports, and into the mixing chamber. Chaotic mixing of the combustion products occurs in the mixing chamber to improve combustion efficiency and reduce combustion products pass from the mixing chamber through the nozzle exit plane thus producing reduced thrust with enhanced radiation intensity.

12 Claims, 1 Drawing Sheet

THRUST-REDUCING, CHAOTIC-FLOW NOZZLE

BACKGROUND OF THE INVENTION

The present invention relates to rocket motor assemblies generally, and more particularly, to a thrust reducing nozzle assembly for a rocket decoy.

Infrared-radiation decoys have been used to protect friendly aircraft from attack by enemy missiles. An effective decoy must match the radiation signature and flight parameters of the aircraft it is designed to protect. The intensity, wavelength and spacial distribution of radiation generated by the decoy must closely match that of the aircraft. Additionally, there are limitation on thrust levels.

Flares are one type of infrared-radiation decoy. Flares are pyrotechnic devices which burn at atmospheric pressure and produce a high-intensity point of radiation. However, since flares are non-propulsion devices, they do not escort the aircraft, but rather freefall away from it. Accordingly, flares provide protection for only a short interval of time.

Rocket decoys can offer advantages over flares. Rocket type decoys are designed to generate thrust as opposed to a zero thrust flare. In this manner, the rocket decoy can fly behind and escort an aircraft over an extended period of time. However, it has been found that rocket decoys are limited by certain factors. These factors include the inability to achieve maximum combustion temperature (i.e., exhaust plume intensity) due to inadequate mixing of combustion species. This creates problems in simulating the exhaust plume of the aircraft to be protected. Additionally, the mass flow rate required to achieve the desired exhaust plume intensity can produce a thrust level too high for best performance. Specifically, an excessive thrust level can cause the decoy to overtake the aircraft it is intended to protect. One attempt to reduce the rocket thrust was to arrange the exhaust nozzles of the rocket motor assembly outboard, away from the flight center line to direct exhaust jets radially outward. However, this approach has been found to dissipate the exhaust flow, resulting in an undesirable reduction in exhaust plume intensity.

Thus, there is a need to provide a rocket motor assembly having a nozzle that facilitates increased combustion and exhaust plume temperatures, while enabling a thrust level reduction.

SUMMARY OF THE INVENTION

The present invention is directed to a rocket motor nozzle that avoids the problems and disadvantages of the prior art. The invention accomplishes this goal by providing a nozzle construction that increases combustion efficiency, while permitting thrust reduction. The nozzle has an outer generally cylindrical wall and a cup-shaped member disposed therein. The cup-shaped baffle includes a generally cylindrical portion which is spaced radially inward from the generally cylindrical outer wall of the nozzle, thereby forming a channel or plenum chamber therebetween. The cylindrical portion also includes multiple ports to provide fluid communication between the plenum chamber and the interior of the cup-shaped member for mixing and subsequent discharge. In operation, the nozzle is positioned downstream from a conventional rocket combustion chamber with the closed end of the cup-shaped member facing the chamber. As propellant burns in the combustion chamber the combustion products flow into the outer channel of the nozzle, then radially inward through the multiple nozzle jet ports and into the mixing chamber. In the mixing chamber, the jet streams impinge upon each other to cause chaotic mixing, which improves combustion efficiency, but does not enhance thrust. Thrust in fact is reduced. The combustion products then exit from the mixing chamber through the open end of the cup-shaped member.

Another important feature of the invention is that the cylindrical portion of the cup-shaped member is concentrically positioned within the outer wall of the nozzle. This ensures flow equilibrium. Additionally, the ports are substantially equidistantly spaced in the circumferential direction of the cylindrical portion. With this configuration the net direction of the combustion jets in the mixing chamber is zero. This advantageously minimizes the thrust of the rocket decoy.

As evident from the foregoing, the nozzle of the present invention improves decoy performance by inducing turbulent mixing of the combustion products, resulting in increased reaction temperature and exhaust plume intensity. It also allows the propellant to burn at selected design pressures consistent with reliable and reproducible operation, while producing lower thrust levels than can be achieved with conventional nozzles The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENT

Figure 1:
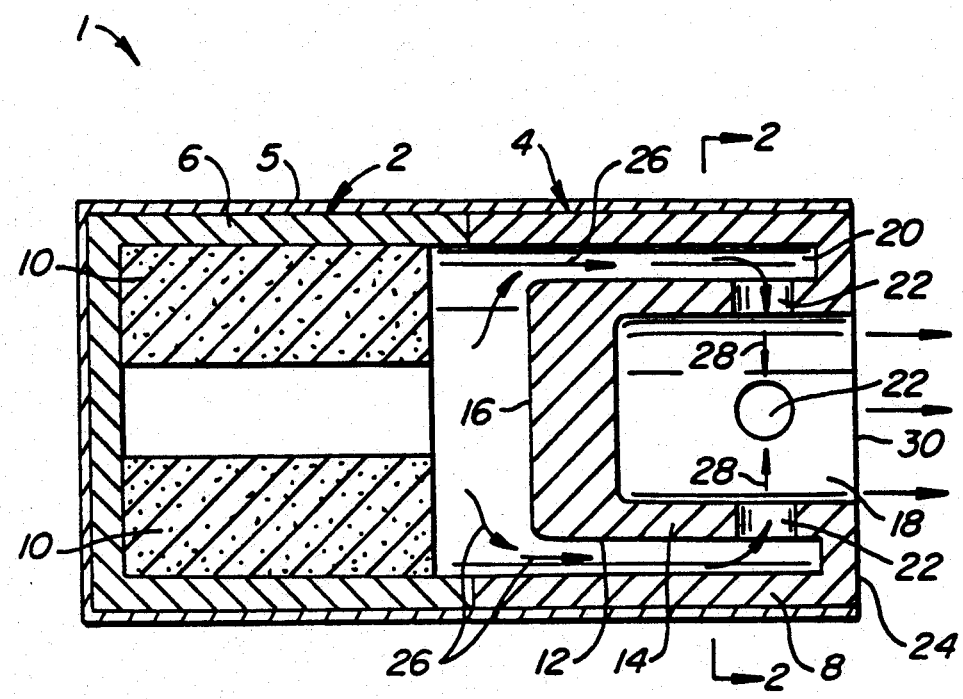
FIG. 1 is a sectional view of the rocket motor assembly and nozzle in accordance with the principles of the present invention.

Referring to the drawings in detail, wherein like numerals indicate like elements, rocket motor assembly 1 is illustrated in accordance with the principles of the present invention. Rocket motor assembly 1 generally includes combustion chamber portion 2 and nozzle portion 4 through which high pressure combustion products or gases generated in combustion chamber 2 exit the rocket motor assembly.

Referring to FIG. 1, combustion chamber 2 and nozzle 4 are positioned in a conventional rocket motor casing 5 and secured thereto as is known in the art (nozzle 4 can be adhesively bonded to casing 5, for example). Combustion chamber 2, which is of conventional construction, includes cup-shaped liner 6 for containing an energetic composition 10 and insulating casing 5 as is known in the art. Although energetic composition 10 is shown as being in tube form, other conventional configurations and arrangements can be used, for example, without departing from the scope of the present invention. The materials used to make up cup-shaped liner 6 can vary widely as will be evident to one skilled in the art. Materials used to construct cup-shaped liner 6 include phenolics, for example.

Figure 2:
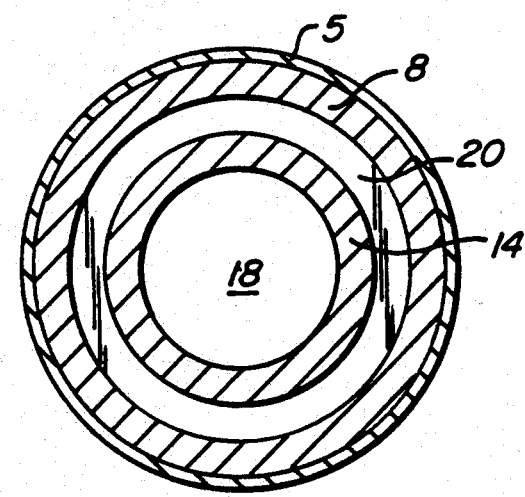
FIG. 2 is a sectional view of the nozzle taken along line 2—2 of FIG. 1.

Referring to FIGS. 1 and 2, nozzle assembly 4 includes an outer preferably cylindrical shell 8 and a cup-shaped baffle 12 positioned therein. Shell 8 abuts cup-shaped liner 6 as is conventional in the art. Cup-shaped member 12 includes a preferably cylindrical portion 14 and an imperforate end wall or baffle 16 which form mixing chamber 18. Cylindrical portion 14 is spaced radially inward from outer shell 8 to form annular channel or plenum 20. Cylindrical portion 14 also includes multiple ports 22 which provide fluid communication between annular channel 20 and mixing chamber 18. Annular wall 24 extends between outer shell 8 and cylindrical portion 14 at a location downstream from ports 22. Annular wall 24 ensures that the combustion products entering annular channel 20 do not escape the motor assembly before entering mixing chamber 18.

In operation, energetic combustion 10 is reacted to produce combustion products that include a hot, high-pressure product gas. Baffle 16 causes the product gas or combustion products generally designated with reference numeral 26 to flow into annular chamber 20 from which the combustion products flow through the multiple nozzle jet ports 22 into the mixing chamber 18. In the mixing chamber, the jet streams, generally illustrated by the arrows 28, impinge upon each other to cause chaotic mixing which improves combustion efficiency. The combustion products then pass from the mixing chamber through the exit plane or open end 30 of cup-shaped member 12, producing reduced thrust with enhanced radiation intensity.

Referring to FIG. 2, cylindrical portion 14 is concentrically positioned within outer shell 8 and jet ports 22 are equidistantly spaced along the circumference of cylindrical portion 14. This arrangement balances the jet stream energy entering mixing chamber 18. As a result, the net direction of jets 28 is zero, thereby minimizing thrust.

Conventional propellants can be used in conjunction with the present invention. Typically, such propellants comprise aluminum and an oxidizer. However, propellants comprising magnesium as opposed to aluminum provide a brighter plume and can burn at a variety of pressures to facilitate matching the radiation signature and flight parameters of the aircraft that the decoy it is designed to protect. Accordingly, propellants comprising magnesium may be preferred. However, it should be understood that the specific propellant composition is selected based upon the intensity, wavelength and spacial distribution of radiation generated by the exhaust plume of the specific aircraft that the decoy is designed to closely match.

The sizes and materials used to make up the nozzle assembly can vary widely as will be evident to one skilled in the art. Materials used to construct the nozzle assembly may include graphites and reinforced phenolics, for example. The exact number, size and placement of the jet ports as well as the dimensions of the annular chamber and mixing chamber are determined according to the mass flow rate desired to exit the nozzle. That mass flow rate should provide the desired flight parameters and the radiation signature of the aircraft the decoy is designed to protect. The flow areas are optimized as is conventional in the art. In all cases, however, the cross-sectional areas of the annular chamber and mixing chamber must each be greater than the total jet port flow area. Additionally, the jet ports can be aligned with their center axes perpendicular to the nozzle center line as illustrated in FIG. 1, or they may be slightly canted rearwardly up to about 10 degrees.

Merely to exemplify a preferred make up of the nozzle assembly, the following example may be recited. It is understood that this example is given by way of illustration and not intended to limit the scope of this invention.

EXAMPLE 1

The tested nozzle assembly of this invention was constructed of ATJ graphite. Four equally spaced 0.25-inch diameter jet ports were used. The cross-sectional area of the annular chamber and exit plane of the cup-shaped member were 7 and 12 times greater than the total jet port area, respectively. The mixing chamber length to diameter ratio (L/D) was 0.55. Specifically, the mixing chamber length was about 1 inch and its diameter about 1.8 inches. The axial length of the nozzle was about 1½ inches. The nozzle was spaced axially from the propellant about ½ inch. The combustion chamber had an inner diameter of about 3 inches. The propellant was tubular in configuration with a wall thickness of about 1 inch and length of about 6½ inches. The propellant used comprised approximately 40 percent by weight magnesium, approximately 40 percent by weight ammonium perchlorate and approximately 20 percent by weight hydrocarbon binder to bind the magnesium and ammonium perchlorate powders together. It was found that the thrust delivered by this nozzle was approximately ½ the minimum value that could have been achieved with a conventional nozzle. Measurements also indicated that the exhaust plume intensity was extraordinarily high.

The above is a detailed description of a particular embodiment of the invention. It is recognized that departures from the disclosed embodiment may be made within the scope of the invention and that obvious modifications.,will occur to a person skilled in the art. The full scope of the invention is set out in the claims that follow and their equivalents. Accordingly, the claims and specification should not be construed to unduly narrow the full scope of protection to which the invention is entitled.

What is claimed is:

1. A thrust reducing rocket nozzle comprising:
   an outer generally cylindrical wall having an upstream portion and a downstream portion; and
   a cup-shaped member disposed within said outer wall, said cup-shaped member having a closed end formed by an imperforate wall, an open end directly exposed to the atmosphere, and a generally cylindrical portion extending therebetween, said closed and open ends being in the vicinity of said upstream and downstream portions respectively, said cylindrical portion being radially spaced from said outer wall forming a generally annular channel therebetween, said cylindrical portion further including multiple openings formed therethrough and providing fluid flow communication between said annular chamber and the interior of said cup-shaped member such that when high-pressure rocket gases are introduced into the vicinity of the closed end of said cup-shaped member, the gases enter said channel where they flow downstream through said openings and into said cup-shaped member to exit from said open end.

2. The nozzle of claim 1 wherein the center axes of said openings are generally directed toward the center of said cup-shaped member.

3. A rocket motor assembly including a combustion chamber and a nozzle positioned downstream from said combustion chamber, said nozzle comprising:

a first generally cylindrical member having an upstream end portion adjacent to said combustion chamber and a downstream end portion;

a second generally cylindrical member spaced radially inward from said first generally cylindrical member such that a channel is formed therebetween, said channel being in direct fluid communication with said combustion chamber, said second generally cylindrical member having an upstream closed end and a downstream open end that forms an exhaust exit, said second generally cylindrical member further including at least one port formed therethrough that provides fluid communication between said channel and the interior of said second generally cylindrical member, the center axis of said port intersecting the center axis of said second generally cylindrical member; and an imperforate end wall joined to said second generally cylindrical member and forming said closed, end said end wall having an outer surface facing said combustion chamber and an inner surface facing the open end of said second generally cylindrical member.

4. The rocket motor assembly of claim 3 wherein said channel is annular.

5. The rocket motor assembly of claim 3 wherein said second member includes a plurality of ports substantially equidistantly spaced in the circumferential direction of said second member.

6. The rocket motor assembly of claim 5 wherein said ports are oriented with their center axes lying generally in a plane.

7. The rocket motor assembly of claim 3 wherein said nozzles includes a wall that extends between said first and second generally cylindrical members and is positioned downstream from said at least one port.

8. The rocket motor assembly of claim 3 wherein said second generally cylindrical member includes multiple ports formed therethrough that provide fluid communication between said channel and the interior of said second generally cylindrical member, the transverse cross-sectional area of said channel and the open end of said second generally cylindrical member each are greater than the total port flow area.

9. A rocket motor assembly comprising:
a generally cylindrical upstream portion;
a generally cylindrical downstream portion;
a combustion chamber formed by said upstream portion for housing the reaction of an energetic composition;
a cup-shaped member positioned within said downstream portion, said cup-shaped member having a generally cylindrical section spaced radially inward from said downstream portion such that a channel is formed therebetween, said channel being in direct fluid communication with said combustion chamber, said generally cylindrical section having an upstream end adjacent to said combustion chamber and a downstream open end for discharge of combustion products into the atmosphere, said cup-shaped member including an essentially imperforate end wall that covers said upstream end of said generally cylindrical section; and
a plurality of ports formed through said generally cylindrical section such that said ports provide fluid communication between said channel and the interior of said cup-shaped member, the center axes of said ports intersecting the center axis of said cup-shaped member between said upstream and downstream ends.

10. The rocket motor assembly of claim 9 wherein said cup-shaped member is substantially concentrically positioned within said generally cylindrical downstream portion.

11. The rocket motor assembly of claim 9 including an annular wall downstream from said ports, said annular wall extending between said generally cylindrical section and said downstream portion.

12. The rocket motor assembly of claim 9 wherein the transverse cross-sectional area of said channel and said downstream open end each are greater then the sum of the cross-sectional areas of said ports.

* * * * *